Sept. 4, 1962  C. T. DRUMPELMANN  3,052,201

MOUNTING FOR HEAVY DUTY BATTERY

Filed Dec. 11, 1948  2 Sheets-Sheet 1

INVENTOR
Carlton T. Drumpelmann
BY
D.C.Harrison
ATTORNEY

Sept. 4, 1962 C. T. DRUMPELMANN 3,052,201
MOUNTING FOR HEAVY DUTY BATTERY
Filed Dec. 11, 1948 2 Sheets-Sheet 2

INVENTOR
Carlton T. Drumpelmann
BY
D.C. Harrison
ATTORNEY 3,052,201
MOUNTING FOR HEAVY DUTY BATTERY
Carlton T. Drumpelmann, Rocky River, Ohio, assignor, by mesne assignments, to Union Carbide Corporation, a corporation of New York
Filed Dec. 11, 1948, Ser. No. 64,759
8 Claims. (Cl. 114—20)

This invention relates to a heavy duty deferred action, gas depolarized and gas activated dry battery and has for an object to provide a mounting or support for such battery in a vehicle in which inertia thrusts of acceleration of the vehicle have no adverse effect upon the conductivity of the battery. Another object is to provide such a battery capable of being quickly activated automatically in response to closing an electric circuit. A further object is to provide such a battery of thin flat cells capable of improved space economy and improved power output per unit of weight and volume of the battery.

Referring to the drawings.

Figure 1:
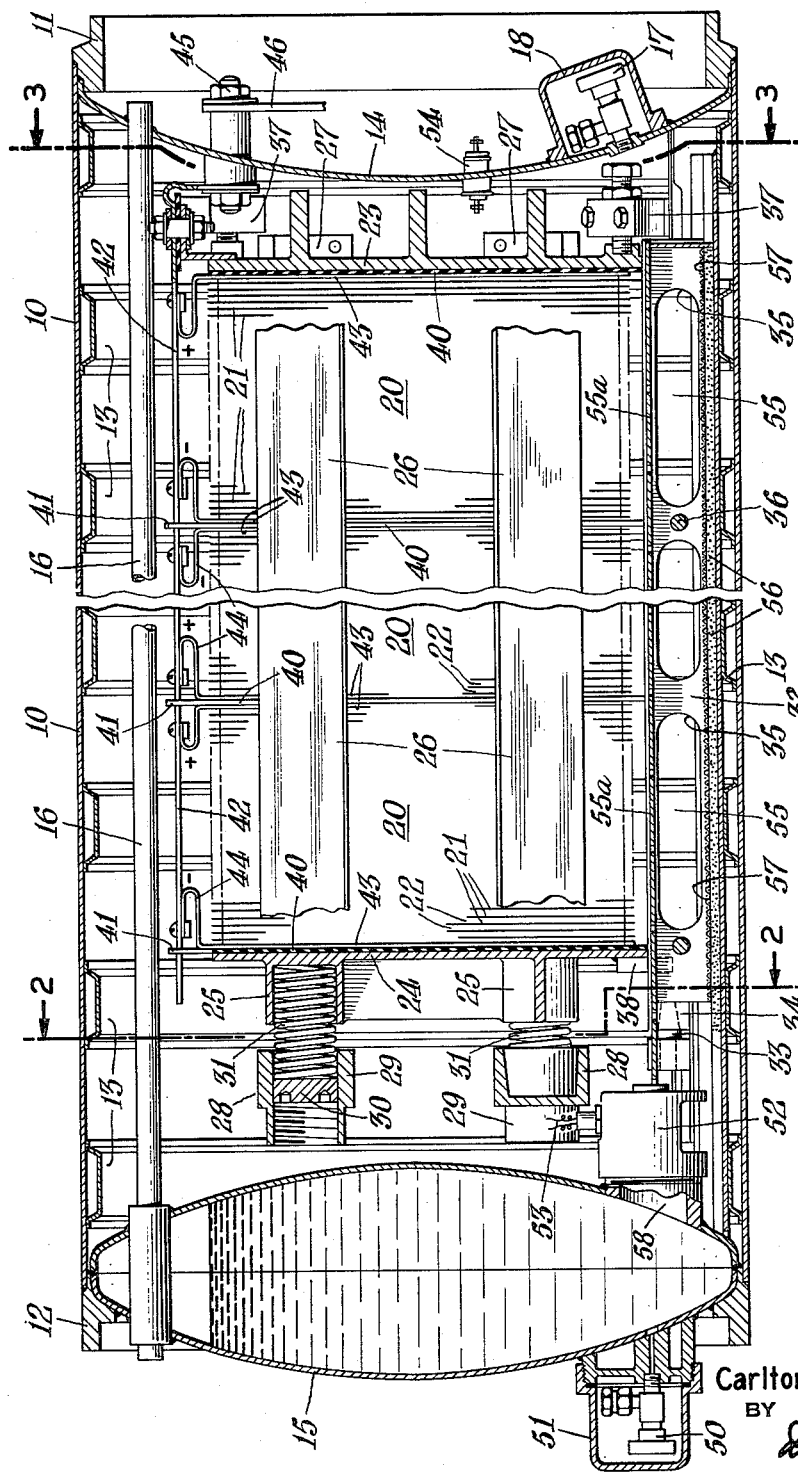
FIG. 1 is a longitudinal section through one embodiment of this invention.

Referring to FIG. 1 of the drawings, an enclosing casing or metal torpedo shell 10 has an aft joint ring 11 and a forward joint ring 12 with each of which the shell is connected by a welded joint. A plurality of reinforcing ribs 13 is useful in preserving strength with minimum weight. The aft bulkhead 14 is the one through which the battery terminal leads extend while the forward bulkhead 15 constitutes a chamber for the storage of liquid chlorine. A tube 16 runs substantially the full length of the battery for the purpose of having fore and aft controls for a torpedo passing therethrough. The battery with its casing is adapted for embodiment in a submarine torpedo. On the aft bulkhead an exhaust valve 17 enclosed within a casing 18 is useful when the casing is to be connected with a vacuum pump for purposes of exhausting the inside of the casing and enabling the battery is to be more quickly activated following the discharge of liquid chlorine from the storage tank 15 and its vaporization within the casing for actuating the battery.

Figures 2, 3, 4:
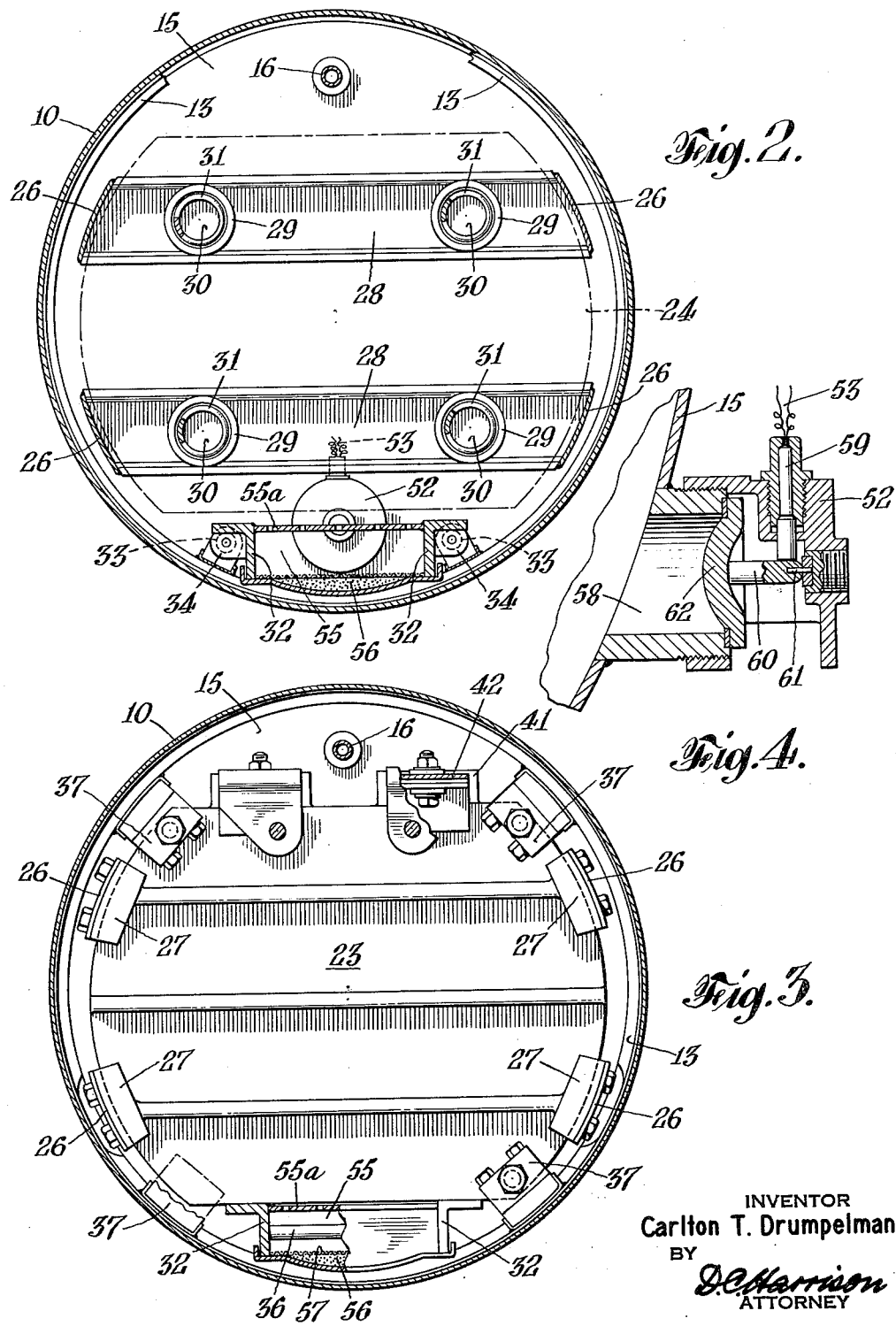
FIG. 2 is a section on the line 2—2 of FIG. 1.
FIG. 3 is a section on the line 3—3 of FIG. 1.
FIG. 4 is a section through the squib actuated relief valve on the liquid chamber 15.

Within the casing are arranged several stacks 20 of thin flat type cells having thin anode plates 21 of zinc between which are placed cathode and immobilized paste electrolyte portions 22. Each cell is of the type disclosed in the prior application of H. M. Zimmerman and N. C. Cahoon, Serial No. 53,174, filed October 7, 1948, and issued October 23, 1951 as U.S. Patent No. 2,572,296, for "Primary Cell and Battery and Method of Making Same." Each cell is of the type in which the cathode is porous for absorption of chlorine gas and for the taking up of the chlorine into an aqueous solution for depolarizing and activating the cell. Adjacent the aft bulkhead 14 is the aft compression plate 23 adjustably fixed with respect to the casing and against which the battery is compressed. A forward compression plate 24 presses against the opposite end of the battery and is shaped to provide spring positioning cups 25. Longitudinal tie straps 26, four in number, extend the full length of the battery for holding the battery compressed. These straps 26 are fastened to the aft compression plate 23 by positioning lugs 27 shown in FIG. 3. The same straps 26 are fastened at the forward end to tie channels 28 as shown in FIG. 2. Spring cups 29 are mounted from these tie channels 28 for holding the compression plugs 30 adjustable therein. The four springs 31 extend between the compression plugs 30 in the cups 29 and the cups 25 carried by the compression plate 24.

The entire battery asemblage rests upon the supporting angles 32 shown in each of FIGS. 1 to 3. Locating pins 33, two in number at the forward end, engage socket portions 34. The angles 32 have perforations 35 therein to facilitate the passage of chlorine gas on activation of the battery and tie rods 36 connect these angles as shown in FIG. 3. The aft compression plate 23 is secured against movement during travel of the torpedo by means of four end thrust lugs 37 shown in FIGS. 1 and 3. The position of the aft compression plate 23 is adjusted by means of the bolts illustrated passing through these thrust lugs and engaging the compression plate as shown in FIG. 1. The forward compression plate 24 is free to slide along the supporting angles 32 in order that the springs 31 may take up any change in length of the battery and maintain the internal resistance of the battery more nearly substantially constant. This forward compression plate is kept from movement in other directions by means of the hold-down clips 38 shown in FIG. 1.

The battery stacks 20 are each separated from one another and are partially supported by insulating plates 40 shown in FIG. 1. Slotted tabs 41 on top of the insulating plates 40 are provided as supports for the bus bars 42, see FIGS. 1 and 3. At the end of each cell stack is a heavy zinc plate 43 provided with leads 44 connecting the plate to its bus bar. These bus bars terminate, as shown in FIG. 1, under insulated terminals 45 extending through the aft bulkhead 14. Motor leads 46 extend from these terminals 45 to the motor or other translating device.

Liquid chlorine for operation of the battery is stored in the chamber 15. A filling valve 50 is enclosed within protecting cover 51 to avoid leakage when not in use. At the time of activation of the battery, liquid chlorine enters the battery compartment through the discharge valve 52, see FIGS. 1 and 4. If the tank is filled with chlorine against air pressure, the gas at the top of the chamber tends to force chlorine out of the chamber through valve 52 when the valve is opened. This valve is opened by the explosive force of a squib which is electrically fired from a remote position by means of leads attached to the squib control terminals 53. These control wires extend through insulated bushings or terminals 54 in the aft bulkhead.

When the liquid chlorine tank is opened the liquid flows along the supporting angles 32, the space between them forming a vaporization chamber 55. Pieces of aluminum foil 56 or other materials to react with the chlorine are disposed in the bottom of the chamber 55 and may be held down by means of a screen 57. The reaction of chlorine with aluminum and many other metals is exothermic, providing heat to aid in the rapid vaporization of the liquid chlorine. The outlet passage 58 from the chlorine tank 15 is closed by the valve 62 held by pin 60 as shown in FIG. 4. A screw holds the pin in position and a frangible pin 61 between the valve pin 60 and the screw is adapted to be severed on firing of the squib 59.

Among the advantages of this invention may be mentioned the important space economy resulting from having the battery plates of more nearly the configuration of the enclosing casing and the torpedo in which they are confined. Thrusts of set-back on starting are in an axial direction, that is, axially of both the battery cells and of the vehicle or torpedo. Upon rapid acceleration of the torpedo or vehicle, thrusts of set-back have no adverse effect upon the conductivity of the battery. Only four compression springs 31 are needed and space is saved by having the cells more nearly the size and shape of the torpedo than is possible with many large springs arranged on the sides of the battery. The liquefied chlorine is maintained in a tank at the forward end of the battery casing so that set-back assists in discharging liquid from this tank and forcing it longitudinally of the battery around the vaporizing chamber 55. Across the top of chamber 55 is a perforate plate 55a which allows the vaporized chlorine to pass out into contact with the cathodes of the battery. Also any liquid chlorine which might escape is free to run back into chamber 55.

What is claimed is:

1. A vehicle containing a battery of cells arranged axially in the direction of vehicle travel, an abutment fixed to the vehicle adjacent the rear of said battery in the direction of vehicle travel and against which the battery abuts, a second abutment adjacent the front end of the battery in the direction of vehicle travel, and a spring between the second abutment and battery for pressing the battery cells against the first abutment whereby acceleration of the vehicle on starting assists said spring in pressing the cells against the first mentioned abutment to aid in maintaining the internal resistance of the battery substantially constant.

2. A vehicle according to claim 1 in which end walls are provided beyond each of said abutments, the forward end wall having another wall secured thereto between the second abutment and the adjacent end wall and a relief valve for the discharge of depolarizing liquid from the space between said transverse walls.

3. A heavy duty deferred action chlorine depolarized battery of thin, flat primary cells, clamped together, each cell of said battery comprising thin, flat plates with immobilized paste electrolyte material therebetween, an elongated casing enclosing said battery, and resilient clamping means for said battery transmitting pressure longitudinally of said casing and between said plates and through electrolyte material of the cells, one longitudinal end of the battery being fixed with respect to the casing, the opposite end of the battery being slidably supported with respect to the casing.

4. A heavy duty chlorine depolarized battery of thin, flat primary cells clamped together, an elongated casing extending longitudinally of the battery axis, means between the battery and casing for clamping the battery under pressure independently of the casing, and a liquid chlorine tank located at one end of the casing between said clamping means and said casing for activating the battery.

5. A heavy duty chlorine depolarized battery of thin, flat primary cells clamped together, an elongated casing extending longitudinally of the battery axis, means between the battery and casing for clamping the battery under pressure independently of the casing, and isulating supports below the battery intermediate its end portions, any liquid chlorine being free to fall beneath the battery and not be held in contact with any of the battery cells.

6. In a battery of the type having thin, flat primary cells with immobilized paste electrolyte between plate electrodes of each cell, an elongated enclosing casing around the battery and means for resiliently clamping said battery longitudinally of the casing, including end clamping plates through which pressure is applied to the battery, the combination therewith of the improvement adapting said battery for embodiment in a vehicle and transmitting thrusts between the battery and casing due to starting the vehicle to assist in maintaining the internal resistance of the battery substantially constant, said improvement including thrust lugs between a lagging end wall of the casing and the rear end clamping plate of the battery, clamping straps between said casing and battery extending lengthwise of the casing and rigidly secured to said rear end clamping plate, a transverse member adjacent a leading end of the casing between the battery and casing end wall and to which said straps are secured, springs between said transverse member and forward end clamping plate, and a support between said casing and battery along which the forward battery end plate may be movable, whereby the internal resistance of the battery tends to be maintained uniform on starting the vehicle.

7. A battery and casing of the type mentioned in claim 6 in which an adjustable abutment is provided for each forward spring at an end thereof.

8. A battery and casing according to claim 7 in which said adjustable abutment is located at the forward end of each spring between the transverse member and spring.

References Cited in the file of this patent

UNITED STATES PATENTS

| | | |
|---|---|---|
| 902,975 | Lake | Nov. 3, 1908 |
| 1,040,055 | Thomson | Oct. 1, 1912 |
| 1,332,483 | Bridge | Mar. 2, 1920 |
| 1,379,088 | Edison | May 24, 1921 |
| 2,396,534 | Rose | Mar. 12, 1946 |
| 2,403,567 | Wales | July 9, 1946 |
| 2,428,850 | Lawson | Oct. 14, 1947 |
| 2,433,024 | Burgess | Dec. 23, 1947 |
| 2,494,265 | Samalion | Jan. 10, 1950 |
| 2,988,587 | Haring | June 13, 1961 |
| 2,990,441 | Marsal | June 27, 1961 |

FOREIGN PATENTS

| | | |
|---|---|---|
| 336,844 | Great Britain | Oct. 23, 1930 |

UNITED STATES PATENT OFFICE
CERTIFICATE OF CORRECTION

Patent No. 3,052,201                                  September 4, 1962

Carlton T. Drumpelmann

It is hereby certified that error appears in the above numbered patent requiring correction and that the said Letters Patent should read as corrected below.

Column 1, line 44, strike out "is"; column 2, line 3, for "asemblage" read -- assemblage --; column 4, line 2, for "isulating" read -- insulating --.

Signed and sealed this 26th day of March 1963.

(SEAL)
Attest:

ESTON G. JOHNSON                                DAVID L. LADD

Attesting Officer                                     Commissioner of Patents